J. M. BEATH.
Absorbing Ammonia-Gas in Water.

No. 159,998. Patented Feb. 23, 1875.

Witnesses:
A. Ruppert
R. Edw. Eils

Inventor:
John M. Beath

THE GRAPHIC CO.PHOTO.-LITH.39 & 41 PARK PLACE, N.Y.

UNITED STATES PATENT OFFICE.

JOHN M. BEATH, OF SAN FRANCISCO, CALIFORNIA.

IMPROVEMENT IN ABSORBING AMMONIA GAS IN WATER.

Specification forming part of Letters Patent No. 159,998, dated February 23, 1875; application filed April 21, 1874.

*To all whom it may concern:*

Be it known that I, JOHN M. BEATH, of San Francisco, in the county of San Francisco and State of California, have invented a certain Improvement in the Art of Absorbing Ammonia Gas in Water, of which the following is a specification:

My invention, relating to the absorption of ammonia gas in water or other liquid, is applicable to machines for the manufacture of ice, and also to machines for refrigeration. Its chief purposes are to render the operation of absorbing ammonia gas practicable on a larger scale and by a process more simple and economical than that heretofore in use.

My improved process consists in mixing the gas and water while in transit and keeping the mixture in motion until the absorption is completed by passing it through tubes or pipes, to the external surface of which a cooling agent is applied to withdraw the heat. In this way the absorption may be accomplished under the most favorable conditions, by maintaining a practically uniform pressure and temperature throughout the operation.

In conducting cooling and freezing operations by the process of absorption the intensity of the heat required for expelling the gas from its aqueous solution is proportionate to the quantity of water the solution contains; also, the whole mass of water used has to be heated and cooled through a range of temperature of about 250° Fahrenheit each time it is charged. Therefore, economy in fuel and cost of apparatus demand that the quantity of water used to absorb a given quantity of gas shall be as small as possible. Again, the capacity of water for absorbing ammonia gas depends entirely on the temperature and pressure under which the operation goes on—that is to say, the lower the temperature and the higher the pressure the greater will be the quantity of gas absorbed. When the absorption takes place at about the ordinary temperature of air and water, and about the pressure at which the gas usually comes from an ordinary cooling and freezing apparatus, the quantity of absorbed gas is more sensibly affected by any change of temperature or pressure than when it takes place at higher temperatures and pressures. Therefore, in practice, the most favorable conditions under which absorption can take place are when gas and water are uniformly mixed together, the initial pressure maintained throughout the apparatus without appreciable loss, and the cooling agent brought into the closest possible proximity to all parts of the absorbing mixture.

Figure 1:
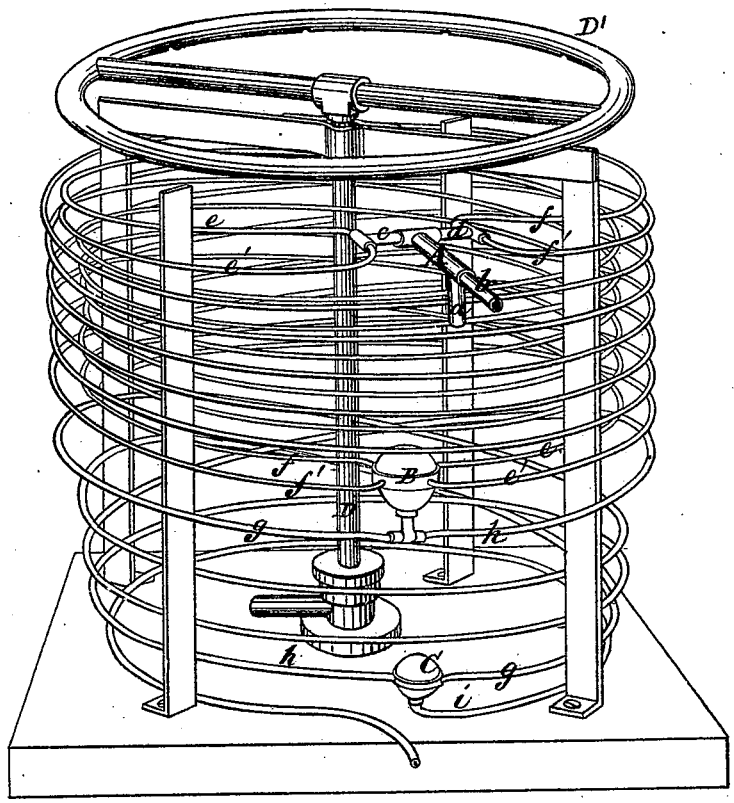
Figure 2:
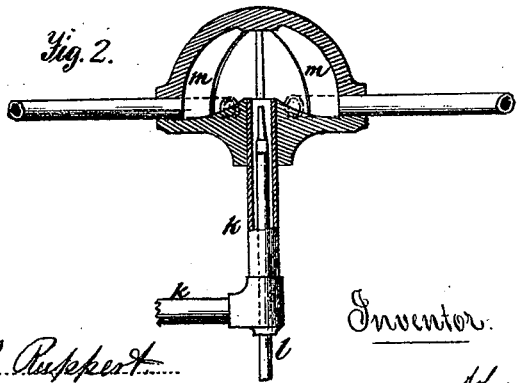

My absorber, designed and constructed in accordance with these principles, is illustrated by the annexed drawings, Figure 1 showing a complete apparatus, and Fig. 2 a modified form of receiver on a somewhat larger scale.

The gas to be absorbed, as it comes from the congealer or refrigerator, is admitted through the neck $a$, and the water through the neck $b$ of the pipe A. The gas and water enter with sufficient velocity to break the water into spray on striking and effect an intimate mixture. The branches $c$ and $d$ divide the stream, and the divided streams are again subdivided so as to supply each of the four pipes, $e$ and $e'$ and $f$ and $f'$, equally with the mixture. These pipes, after making a number of convolutions, all discharge into the receiver B, in which the gas remaining unabsorbed is remixed with the water, and the mixture again divided into two streams by the pipes $g$ and $h$, and, after further absorption during transit, carried by them into the receiver C for still another mingling, and then to be delivered to the single pipe $i$, in which the absorption is completed, should there be any gas remaining after passing the last receiver.

As the mixture of gas and water advances through the pipes of the absorber, its volume is constantly being reduced by the absorption of the gas. Therefore the number of the pipes is successively reduced in each succeeding section until but a single pipe remains, which will ordinarily be sufficient. The intermediate receivers, dividing the absorber into sections, serve to correct any irregularity in the first distribution or mixture of gas and water.

The heat evolved by the absorption is withdrawn from the pipes by any of the means in common use for condensing or cooling fluids in pipes, such as showering them with water, (a means for which is illustrated in the drawings, Fig. 1, at D and D', representing respectively water-conductors consisting of a vertical pipe and a horizontal perforated ring-pipe,)

submerging them in a stream of running water, exposing them to a natural or artificial current of air, assisted by radiation. The extent of surface required to be exposed to the cooling agent may be calculated by the usual methods, and the pipes may be laid in any form for conveniently applying the cooling agent used.

The size and number of the pipes, or their aggregate sectional area, should be calculated to give the gas sufficient velocity to partially carry the water with it, but not so great as to cause any considerable diminution of pressure in the lower sections of the absorber.

As my object is to expose a large surface to the cooling agent, I prefer rather to increase the number of the pipes than their size.

When the number of pipes in the first section is 2, 4, 8, 16, &c., I use the above-described means of distributing the gas and water to the pipes; but when any intermediate number is required I employ the receiver shown in Fig. 2. The gas being admitted through pipe $k$ and the water through pipe $l$, the two streams are thoroughly mixed by striking against the top of the receiver, and the webs $m$ divide the interior into as many compartments as there are pipes to receive the mixture.

What I claim as my invention, and desire to secure by Letters Patent, is—

The process of absorbing ammonia gas in water by mingling them in due proportions while in transit, and then passing the mixture in streams through conduits exposed to a cooling agent, substantially as specified.

In testimony whereof I have signed my name to this specification in the presence of two subscribing witnesses.

JOHN M. BEATH.

Witnesses:
B. EDW. J. EILS,
D. P. COWL.